(12) United States Patent
Firl

(10) Patent No.: US 6,219,159 B1
(45) Date of Patent: Apr. 17, 2001

(54) SPECTRALLY BALANCED SCANNER

(75) Inventor: Gerold G. Firl, Poway, CA (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/037,719

(22) Filed: Mar. 9, 1998

(51) Int. Cl.$^7$ .................................................. H04N 1/46
(52) U.S. Cl. ............................................................ 358/513
(58) Field of Search ..................................... 358/513, 514, 358/509, 520, 515, 516, 461, 483, 482, 475; 382/274

(56) References Cited

U.S. PATENT DOCUMENTS

| | | | |
|---|---|---|---|
| 3,011,388 | 12/1961 | Baumbach et al. | 88/14 |
| 3,757,101 | 9/1973 | Semotan | 240/1.1 |
| 3,757,103 | 9/1973 | Walter | 240/4.2 |
| 3,825,335 | 7/1974 | Reynolds | 355/1 |
| 4,127,868 * | 11/1978 | Nagaoka et al. | 358/29 |
| 4,176,299 | 11/1979 | Thornton, Jr. | 315/326 |
| 4,532,918 | 8/1985 | Wheeler | 128/6 |
| 4,546,379 | 10/1985 | Sarofeen et al. | 358/42 |
| 4,679,073 * | 7/1987 | Hayashi | 358/80 |
| 4,713,683 | 12/1987 | Fujimori | 358/42 |
| 4,760,609 * | 7/1988 | Tamagaki | 382/65 |
| 4,814,956 | 3/1989 | Kano | 362/293 |
| 5,028,839 * | 7/1991 | Abeywickrama et al. | 313/487 |
| 5,075,823 | 12/1991 | Chomyn | 362/2 |
| 5,086,339 * | 2/1992 | Gausland | 358/81 |
| 5,237,409 * | 8/1993 | Yamaguchi | 358/518 |
| 5,282,046 * | 1/1994 | Yamaguchi | 358/518 |
| 5,430,559 * | 7/1995 | Hirota | 358/516 |
| 5,485,284 * | 1/1996 | Shono et al. | 358/504 |
| 5,513,018 * | 4/1996 | Nisimura | 358/474 |
| 5,541,476 * | 7/1996 | Suzuki | 313/487 |
| 5,781,312 * | 7/1998 | Noda | 358/482 |
| 5,917,620 * | 6/1999 | Hasegawa et al. | 358/513 |

* cited by examiner

*Primary Examiner*—Jerome Grant, II
(74) *Attorney, Agent, or Firm*—Jerry R. Potts

(57) ABSTRACT

A color imaging system in which the lamp spectrum is tuned so that, in the charge coupled device, the signal to noise ratio is maximized for all three RGB channels equally. This result is obtained by a process wherein the fluorescent lamp output is adjusted by alteration of the relative amounts of red, green and blue phosphors which coat the inside surface of the lamp. In this manner, when the lamp spectrum is tuned so that the RGB channels of the CCD have equal levels when scanning a white background, the signal to noise ratio can be maximized for all three channels equally. Thus, it is possible to scan a white paper without saturating and all three colors can be scanned simultaneously, since the lamp brightness can be set at a level which maximizes signal strength for all three color signals. That is, the lamp output spectrum and the RGB response of the CCD are tuned to provide balanced system response.

7 Claims, 4 Drawing Sheets

SPECTRALLY BALANCED SCANNER

FIELD OF THE INVENTION

The present invention relates generally to color imaging digital scanners and, more particularly, to spectral balanced scanners and methods of attaining such balance in color imaging systems.

BACKGROUND OF THE INVENTION

Two essential components of a digital scanner, utilized for example in color image reading systems, are a lamp and a charge coupled device (CCD). In spite of their importance in system performance, frequently these elements are chosen on the basis of their individual characteristics, with little regard to how the two will function together.

For example, the CCD may be chosen with a view to its sensitivity and high signal to noise (S/N) ratio while brightness and stability are criteria usually considered when the lamp is chosen. The result can be a mismatch between the output spectrum of the lamp and the CCD sensitivity so that the signal strength of the red, green and blue (RGB) channels of the CCD are unbalanced.

In this regard, the CCD will saturate if driven above a maximum voltage. This places a limit upon exposure, which is dictated by the high output RGB channel. In such a case, the low output channel is sampled at a lower output voltage and, consequently, at a lower signal to noise ratio.

The problem in providing a combined illumination that compensates for the spectral luminous efficiency of conventional image processing devices has been recognized in the prior art and various solutions have been advanced. For example, in U.S. Pat. No. 4,713,683, a system for illuminating and synchronizing color imaging equipment is disclosed. In the system, the illuminating light is irradiated from a light source whose current can be changed. Three color filters are utilized and the light source current can be arbitrarily changed so that the intensity of light of each of the three colors can be controlled to optimum values, through filter selection and/or electrical current adjustment. The system described in the aforesaid patent is complicated, requiring a timing mechanism and a synchronization signal generator to control filter disposition.

In U.S. Pat. No. 4,679,073, there is disclosed a color image reading apparatus for controlling the intensity of a light source illuminating a color document. While this apparatus has some utility, it has limitations also since three separate scans are required, with appropriate lamp brightness adjustments being made for each scan.

Finally, it is known in the prior art that alteration of phosphors in a fluorescent lamp is capable of producing a light of predetermined ICI coordinates. For example, in U.S. Pat. No. 4,176,299, a method is set forth wherein lamp phosphors are adjusted in order to produce a light, perceived by the human eye as approximating that of daylight.

However, the problem is not so easily solved in color imaging systems. A lamp spectrum providing daylight-equivalent illumination for the human eye will not balance RGB output from a color CCD. The greater the imbalance among the three channels, the lower the S/N for the low output channel, since system brightness is limited by the high-output channel.

In view of the foregoing, it would be advantageous to have a color imaging system, and a process for constructing such a system, wherein the spectral output of the lamp is tuned to enable all three CCD channels to operate at the high end of their respective output ranges, thereby maximizing signal to noise ratios. Preferably, such a system, and process, would make it possible to avoid the limitations of conventional, unbalanced systems in which the brightest channel limits total system brightness. Ideally, the process would enable such balancing that the three primary colors in a color document could be scanned simultaneously, without degradation of system performance.

SUMMARY OF THE INVENTION

The above mentioned limitations of the prior art are overcome by providing a color imaging system in which the lamp spectrum is tuned so that, in the charge coupled device, the signal to noise ratio is maximized for all three RGB channels equally. This result is obtained by a process wherein the fluorescent lamp output is adjusted by alteration of the relative amounts of red, green and blue phosphors which coat the inside surface of the lamp. In this manner, when the lamp spectrum is tuned so that the RGB channels of the CCD have equal levels when scanning a white background, the signal to noise ratio can be maximized for all three channels equally. Thus, it is possible to scan a white paper without saturating and all three colors can be scanned simultaneously, since the lamp brightness can be set at a level which maximizes signal strength for all three color signals. That is, the lamp output spectrum and the RGB response of the CCD are tuned to provide balanced system response.

BRIEF DESCRIPTION OF DRAWINGS

The above mentioned and other objects and features of this invention and the manner of attaining them will become apparent and the invention itself will be best understood by reference to the following description of the embodiment of the invention in conjunction with the accompanying drawings, wherein.

BEST MODE FOR CARRYING OUT THE INVENTION

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 1:
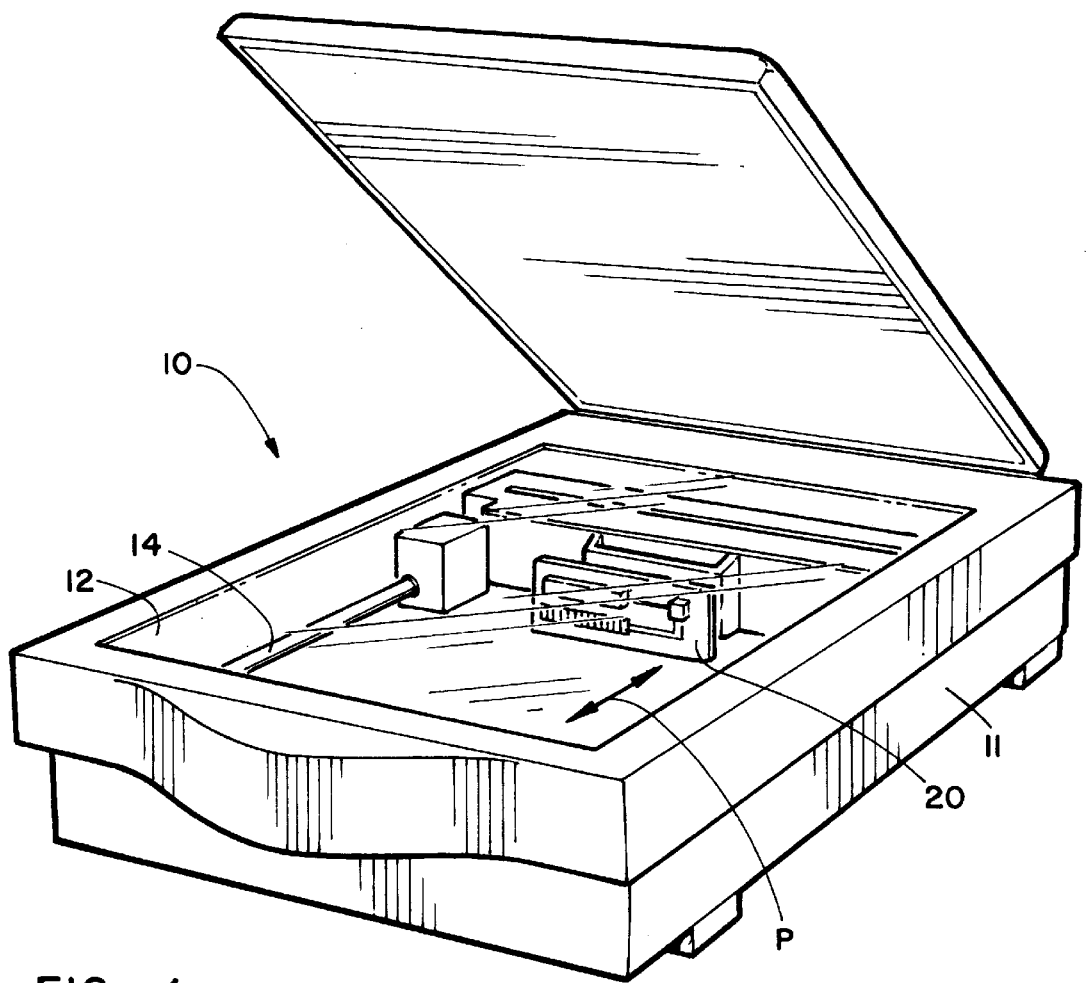
FIG. 1 is a perspective view of a portion of a color imaging system which is constructed according to the present invention.
Figure 2:
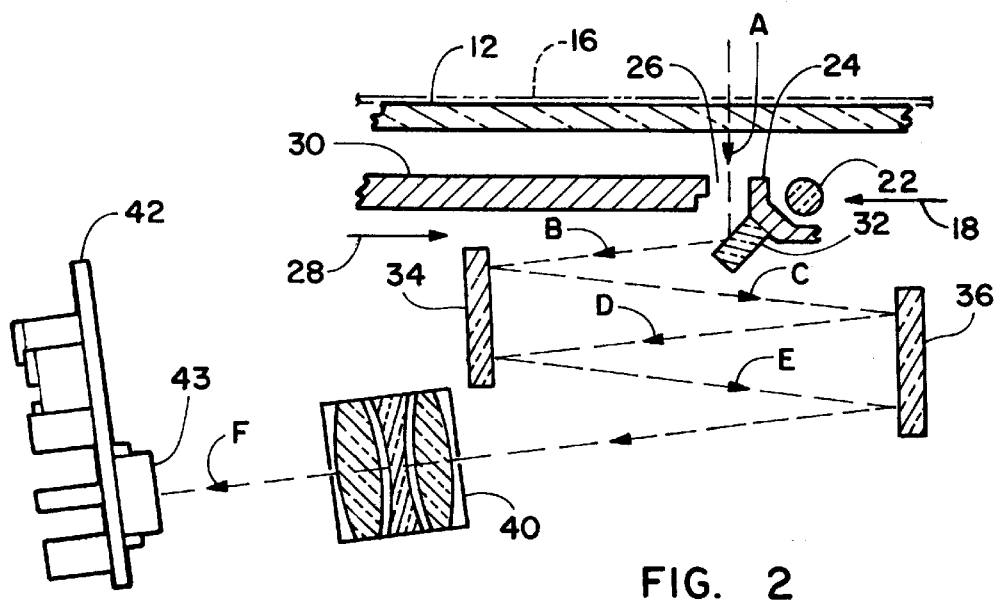
FIG. 2 is a schematic drawing showing components of the color imaging system of FIG. 1.

Referring now to the drawings and more particularly to FIGS. 1–2 thereof, there is shown a color imaging system, such as a scanner system 10, that is constructed in accordance with the preferred embodiment of the present invention. The imaging system 10 is utilized in a computer system (not shown) for acquiring color image or graphic information as well as black textual information from a hardcopy document, such as a document 16 for subsequent storage and retrieval on an as needed basis.

The imaging system 10 generally includes a small footprint housing 11 having mounted therein on a guide or slide rod 14 for rectilinear movement a scanner carriage unit 20. The carriage unit 20 is mounted below a transparent platform surface or window 12 that supports from below a document to be scanned, such as the document 16. In order to illuminate the document 16 with a sufficient amount of light for image and textual pickup purposes, the carriage unit 20 includes a mirror assembly 28 and a lamp and reflector arrangement 18 that illuminates a field of view scanning area defined on the window 12.

As best seen in FIG. 2, the lamp and reflector arrangement 18 generally includes a high intensity lamp 22 and a screen-printed reflector 24. The lamp 22 and reflector 24 are mounted to the carriage unit 20 for reflecting distributed light upwardly through the transparent window 12 onto a desired scanning area of the document 16. The reflector 24 causes light from lamp 22 to be reflected forwardly in the same scanning direction traveled by the carriage unit 20. The reflected light is in the form of a wide beam of sufficient dimension to radiate across the entire horizontal dimension of the defined field of view scanning area defined within the window 12.

Figure 3:
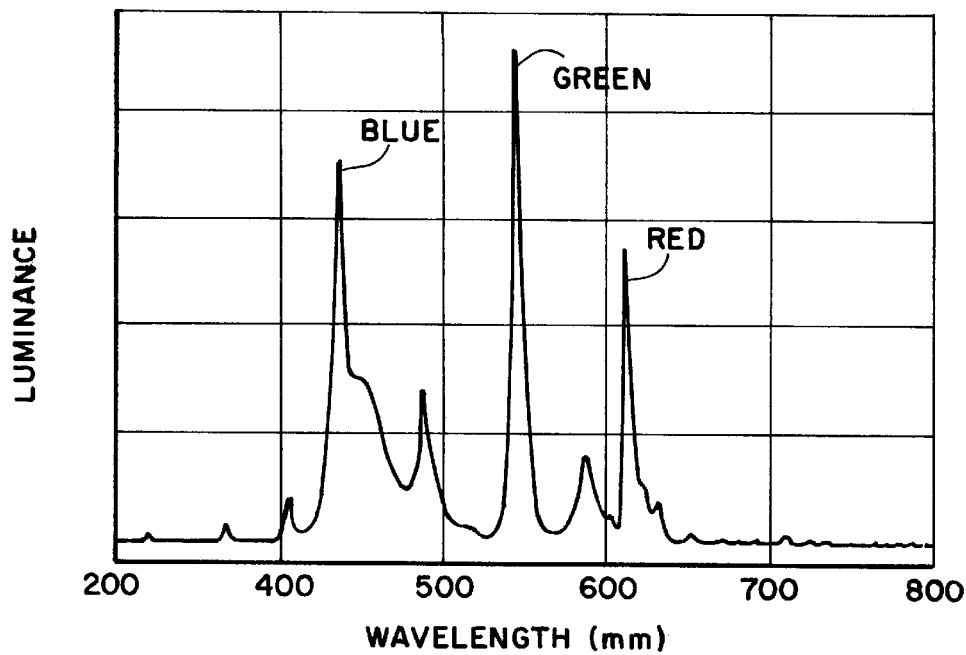
FIG. 3 is a graph showing lamp spectral intensity (luminance) over the visible range.
Figure 4:
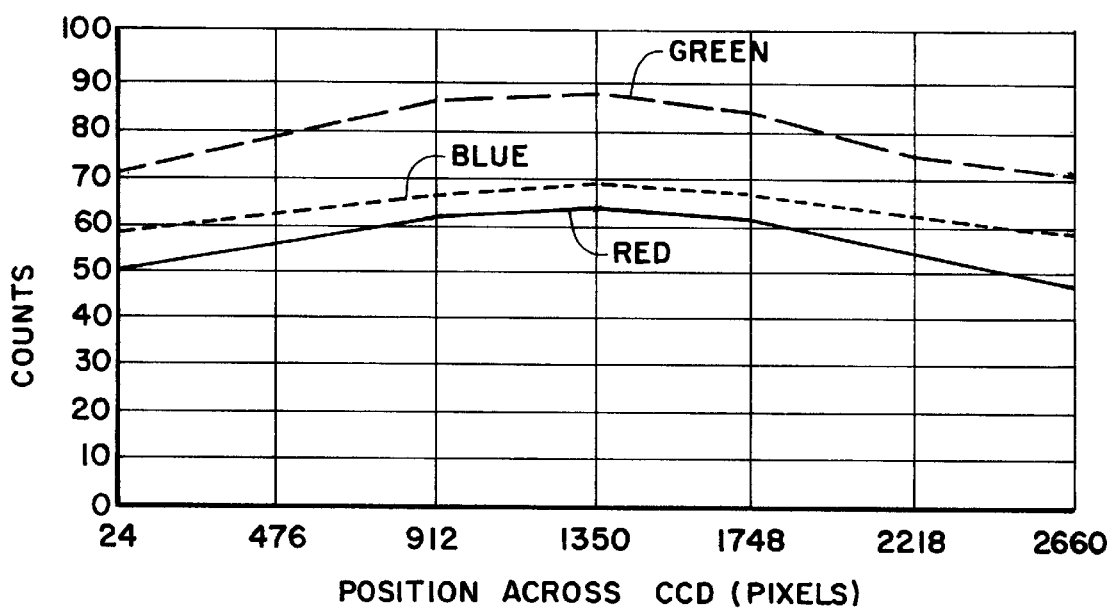
FIG. 4 is a graph showing unbalanced spectral response as seen in prior art lamp/CCD systems.

Considering now the lamp and reflector arrangement 18 in greater detail with reference to FIGS. 2–4, the lamp 22 is an elongated tube like structure that emits a much brighter light at about its center than at about its end portions. In this regard, the light emitted by the lamp 22 is unable to uniformly illuminate a document being scanned, such as the document 16. In order to eliminate the problem associated with too much light illuminating a center portion of a document being scanned and too little light illuminating the end portions of the document being scanned, the reflector 24 is mounted below the lamp 22 in such a manner so as to reflect a sufficient amount of light to properly illuminate the end portions of the document 16, while simultaneously reducing the amount of light reflected to illuminate the center portion of the document 16. In this regard, the reflector 24 is screen printed with a desired illumination control pattern that enables the light reflecting from the reflector 24 to brightly illuminate the end portions of the document illumination area and to more dimly illuminate the center portion of the document illumination area.

Considering now the mirror assembly 28 in greater detail with reference to FIGS. 2 and 3, the mirror assembly 28 generally includes a narrow mirror 32 that is mounted at an angle θ relative to the horizontal plane of the window 12. In this regard, the mirror 32 permits light reflecting from the document 16 to travel downwardly along an irregularly shaped light path, indicated generally by the arrows A through F to a charge coupled device (CCD) 43 that is mounted to a printed circuit board 42. The mirror assembly 28 also includes a pair of spaced apart mirrors including a wide upper mirror 34, and a wide lower mirror 36. The mirrors 34, and 36 are mounted in the light path in order to permit the light reflecting from the document 16 to be reflected to the CCD 43. A lens assembly 40 also mounted in the light path and cooperates with the mirrors 32 and 34 to focus the light reflecting from the document 16 onto the circuits of the CCD 43 for image processing purposes.

Figure 5:
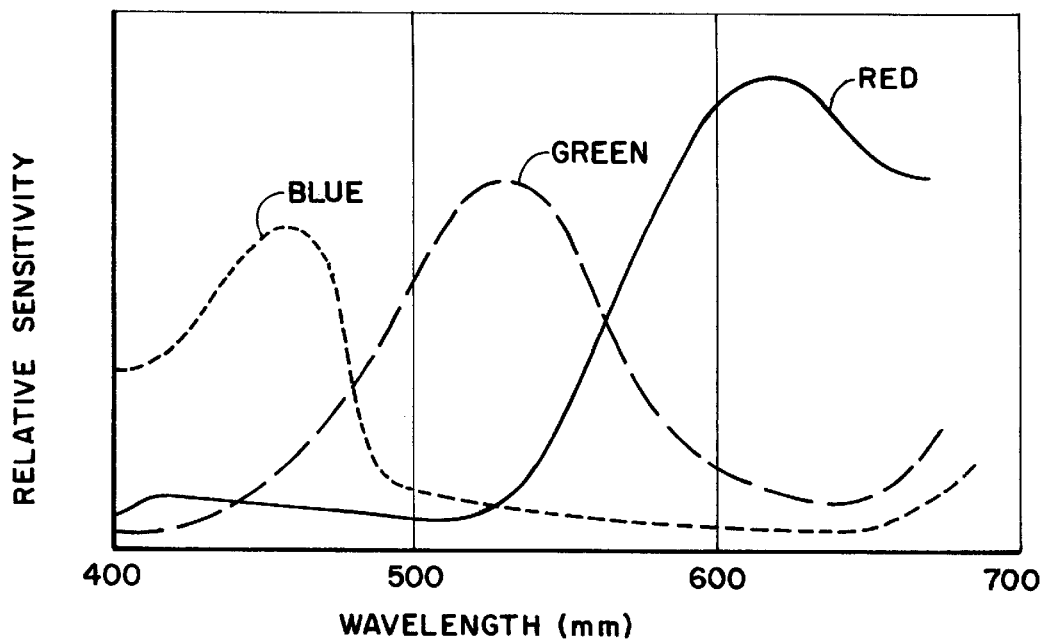
FIG. 5 is a graph showing CCD spectral response for the red, green and blue color channels.

Considering now the CCD 43 in greater detail with reference to FIGS. 2 and 5, the CCD 43 responds to different wavelengths of light in the visible spectrum, such as red, blue and green light. For example, FIG. 5 illustrates one typical spectral response of a charge-coupled device, such as the CCD 43. The CCD 43 is configured to have a fixed input to output response such that light entering the circuits or different channels of the CCD 43 is converted to responsive electrical signals that are indicative of the different wavelengths as well as the different intensity levels of the received light.

In accordance with the novel method of balancing spectral responses, the light output response of the lamp 22 is selected to match the spectral response of the CCD 43. In this regard, the phosphor coating ratios of the lamp 22 are adjusted to provide the optimum lamp/CCD spectral balance to cause the electrical signal outputs for the red, green and blue channels of the CCD 43 to have substantially equal levels when scanning a substantially white background. By controlling the phosphor coating ratios of the lamp 22, the signal to noise ratio for each output channel of the CCD 43 is maximized and controlled to be substantially equal to each of the other output channels.

In FIG. 4, there is a graph showing the spectral balance found in some conventional systems in which the lamp/CCD system is poorly balanced. It will be noted that, at the pixel position 1350 across the CCD, green is at a count of about 86, blue at about 68, and red at about 64. Thus, it can be seen that the blue is approximately 21% lower than the green while the red is approximately 26% lower. In prior art systems having such characteristics, poor color reproduction is achieved unless three separate scans are performed where lamp intensity is increased to compensate for the lower system response of red and blue.

FIG. 5 graphically plots RGB relative sensitivity against wavelength (nm). In conventional CCD's, blue has a peak response at about 445 nm, green at about 526 nm and red at about 620 nm. Blue and green produce equivalent responses at about 480 nm while a green/red equivalent response occurs at about 560 nm. System response is found by integrating lamp output (CCD input) and CCD transfer function. However, in attempts to maximize signal to noise ratios for all three primary colors, it becomes apparent that the electronic technology of the CCD, and the spectral behavior of CCD filter material, present limitations that are not readily changed. Thus, in the effort to optimize system performance, attention became focused on lamp performance with the objective of improving system performance by manipulating the lamp output spectrum.

Referring now to FIG. 3, there is shown a graph in which luminance for the colors blue, red and green, for a cold-cathode fluorescent lamp are plotted on the ordinate while wavelength in nanometers is plotted on the abscissa. The graph has equal application for hot cathode or xenon lamps and it depicts lamp output spectrum as measured by measuring lamp output spectrometrically. It is recognized that color balance can be altered by adjustment of phosphor ratios in the lamp internal coating. In the present invention, spectral balance is achieved when lamp RGB luminance is integrated with the CCD transfer function to achieve equal signal strength for all three primary colors, when viewing a white target.

It will be recognized by one skilled in the art that the spectral response of a CCD from one manufacturer may differ from that of another. Thus, the spectral response of the CCD 43, as set forth in FIG. 5, is typical of a specific CCD.

However, the spectral balancing invention disclosed herein is illustrative of the process of balancing and is useful for different CCD/lamp combinations where different phosphor ratios would be desirable.

Figure 6:
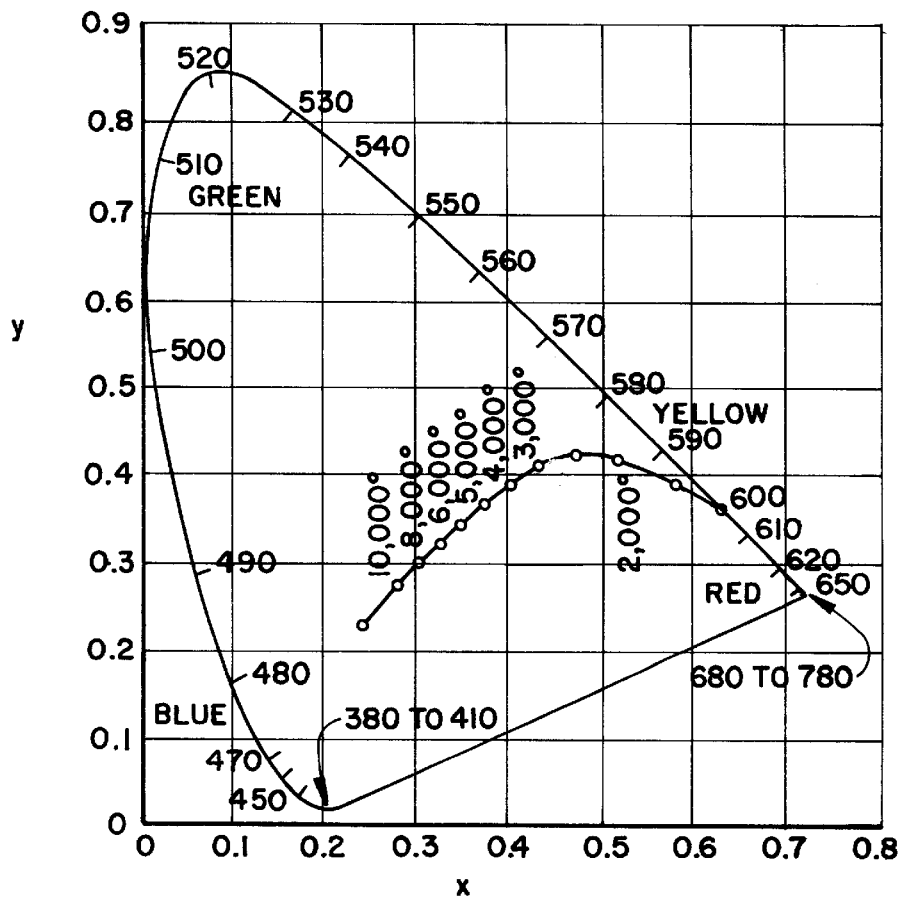
FIG. 6 illustrates the x, y-chromaticity diagram according to ICI standards.

In FIG. 6, there is shown the x, y-chromaticity diagram according to ICI standards, plotted in rectangular coordinates. The ICI color system is described in the "Handbook of Chemistry" by Arthur C. Hardy, The Technology Press, Massachusetts Institute of Technology (1936). As used herein, the term "chromaticity" refers to a qualitative description of color based on hue and saturation, independent of brilliance. Thus, it is the color quality of light definable by its chromaticity coordinates—which are based on matching a sample of light in terms of three stimuli of different, standard colors—or by its complementary or dominant wavelength and its purity taken together.

According to the process of the present invention, spectral balancing can be achieved when the fluorescent lamp output is adjusted by alteration of the relative amounts of red, green and blue phosphors which coat the inside surface of the lamp. As a result of this process, when the lamp spectrum is tuned so that the RGB channels of the CCD have equal levels when scanning a white background, the signal to noise ratio can be maximized for all three channels equally. Thus, it is possible to scan a white paper without saturating and all three colors can be scanned simultaneously, since each color will be at approximately equal intensity. The result achieved is that all three CCD channels operate at the high end of their respective ranges and S/N is maximized.

In determining optimum lamp spectral adjustment, an experimental process of trial and error was followed in an effort to identify the lamp phosphor RGB blend that, when integrated with CCD function, produced the desired results. During the experiments, CCD function was evaluated while various lamp phosphor blends and ratios were utilized. A chromaticity meter was used to measure lamp output in cases where a suitable phosphor blend was found. As a result of the experiments, it was discovered that lamp color coordinates wherein $x=0.34\pm0.01$ and $y=0.315\pm0.01$ on the ICI chromaticity diagram produced optimum spectral balancing.

Figure 7:
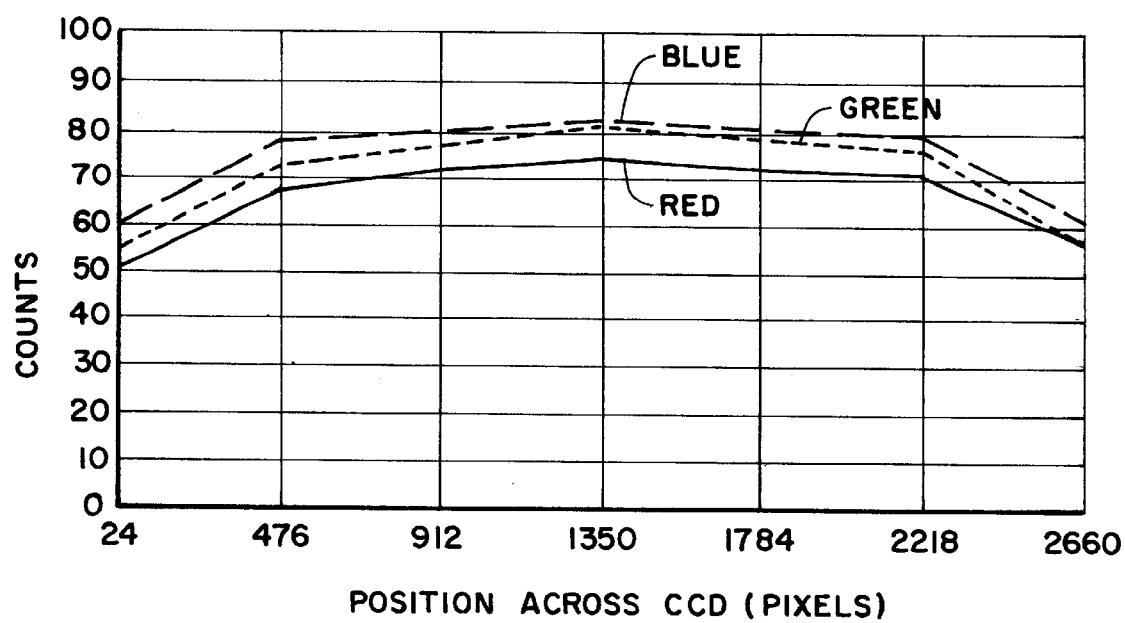
FIG. 7 is a graph showing spectral balance achieved by spectral balancing according to the present invention.

In FIG. 7, there is a graph showing the spectral balance found in a lamp/CCD system which is balanced according to the process of the present invention. It will be noted that at the pixel position 1350 across the CCD, blue is at a count of about 83, green at about 83, and red at about 76 thus giving a blue/green ratio of about 1.01 and a red/green ratio of about 0.93. All three channels are within 10% of each other. As a result, higher color fidelity is accomplished by the image sensing system. In addition, the necessity of three separate scans is eliminated.

It will be evident that there are additional embodiments and applications which are not disclosed in the detailed description but which clearly fall within the scope and spirit of the present invention. The specification is, therefore, intended not to be limiting, and the scope of the invention is to be limited only by the following claims.

What is claimed is:

1. In a color imaging system wherein the spectral emission phosphors of a lamp are processed by a charge coupled device, a method of matching the lamp phosphor spectral emission with charge coupled device sensitivity, comprising the steps of:
    a. determining optimum lamp output chromaticity coordinates for maximizing charge coupled device signal to noise ratios;
    b. applying a blend of phosphors to the lamp interior surface;
    c. measuring lamp emission chromaticity produced by said phosphor blend; and
    d. adjusting said phosphor blend until said optimum chromaticity coordinates are achieved.

2. The method according to claim 1 wherein adjustment of the lamp spectral emission includes controlling the relative intensity of lamp emission to produce light having predetermined chromaticity diagram coordinates.

3. The method according to claim 1 wherein said adjusting step further includes balancing lamp phosphor spectral emission with charge coupled device sensitivity wherein the RGB channel of said charge coupled device function within a range of 10% of each other.

4. The method according to claim 1 wherein the adjusting step includes controlling said phosphor blend to produce chromaticity coordinates of $x=0.34\pm0.01$ and $y=0.315\pm0.01$, on the ICI chromaticity diagram.

5. An imaging system comprising:
    a charge coupled device for converting a plurality of different wavelengths of light into at least three different output signals indicative of the wavelengths in the color spectrums of red, green, and blue respectively; and
    a light arrangement for producing said pluralities of different wavelength of light;
    said light arrangement including a lamp having different phosphor coatings selected in desired ratios to match the spectral response of said charge coupled device so that the different output signals of the charge couple device are maximized and substantially equal in response to substantially white light;
    means for determining optimum lamp output chromaticity coordinates for maximizing charge coupled device signal to noise ratios; and
    means for measuring lamp emission chromaticity produced by said phosphor ratios.

6. A scanner comprising:
    a housing having a transparent supporting surface for supporting from below a medium to be scanned for its informational content;
    a charge coupled device mounted in said housing for converting a plurality of different wavelengths of light into at least three different output signals indicative of the wavelengths in the color spectrums of red, green, and blue respectively; and
    a light arrangement mounted in said housing for producing said plurality of different wavelengths of light; said light arrangement including a lamp having different phosphor coatings selected in desired ratios to match the spectral response of said charge coupled device so that the different output signals of the charge couple device are maximized and substantially equal in response to substantially white light;
    means for determining optimum lamp output chromaticity coordinates for maximizing charge coupled device signal to noise ratios; and
    means for measuring lamp emission chromaticity produced by said phosphor ratios.

7. A method of spectral balancing, comprising:
    providing a charge coupled device for converting a plurality of different wavelengths of light into at least three different output signals indicative of the wavelengths in the color wavelength spectrums of red, green, and blue respectively;

providing a lamp for producing said plurality of different wavelengths of light, said lamp having different phosphor coating ratios matched to the spectral response of said charge coupled device so that the different output signals of the charge couple device are maximized and substantially equal in response to light reflecting from a substantially white background;

determining optimum lamp output chromaticity coordinates for maximizing charge coupled device signal to noise ratios; and measuring lamp emission chromaticity produced by said phosphor ratios.

* * * * *